(12) United States Patent
Hobbs et al.

(10) Patent No.: US 8,161,392 B1
(45) Date of Patent: Apr. 17, 2012

(54) METHODS AND APPARATUS FOR MANAGING A SHARED GUI

(75) Inventors: David Victor Hobbs, Surrey (CA); Ian Cameron Main, Vancouver (CA); Christopher G Hipp, Redwood City, CA (US)

(73) Assignee: Teradici Corporation (CA)

( * ) Notice: Subject to any disclaimer, the term of this patent is extended or adjusted under 35 U.S.C. 154(b) by 1429 days.

(21) Appl. No.: 11/688,107

(22) Filed: Mar. 19, 2007

Related U.S. Application Data

(60) Provisional application No. 60/743,576, filed on Mar. 20, 2006, provisional application No. 60/669,212, filed on Apr. 6, 2005, provisional application No. 60/719,823, filed on Sep. 22, 2005.

(51) Int. Cl.
*G06F 13/00* (2006.01)
*G06F 15/00* (2006.01)

(52) U.S. Cl. ........................................ 715/736; 715/740

(58) Field of Classification Search .......... 715/763–765, 715/751–753, 740–744, 736, 854, 851
See application file for complete search history.

(56) References Cited

U.S. PATENT DOCUMENTS

| 7,793,232 | B2 * | 9/2010 | Chaudhri et al. ............. 715/802 |
| 2004/0015597 | A1 | 1/2004 | Thornton |
| 2004/0080526 | A1 | 4/2004 | Thornton |
| 2006/0114887 | A1 * | 6/2006 | Kashimoto ................... 370/352 |

OTHER PUBLICATIONS

Schmidt, B., Lam, M., Northcutt, J., "The Interactive Performance of Slim", Operating Systems Review, Dec. 1999, 134(5):32-47, ACM, USA.

* cited by examiner

*Primary Examiner* — Kevin Nguyen

(57) ABSTRACT

A system and methods for connecting a computer and at least one computing appliance to a graphic user interface comprising a display and peripheral devices is disclosed. A user interface session is associated with a computer connected to the graphic user interface by a network connection. A second user interface session, comprising a display overlay and new user interface settings is established in response to a user event such as a telephony event associated with the computing appliance. In an embodiment, user settings are adjusted on an ongoing basis in response to input device events.

18 Claims, 9 Drawing Sheets

METHODS AND APPARATUS FOR MANAGING A SHARED GUI

RELATED APPLICATIONS

This application claims priority to U.S. Provisional Patent Application Ser. No. 60/743,576, entitled METHODS AND APPARATUS FOR SHARING A GUI BETWEEN A HOST COMPUTER AND PERIPHERAL APPLIANCES, filed Mar. 20, 2006, incorporated herein by reference in its entirety. This application is also related in part to U.S. Non-Provisional Patent Application Ser. No. 11/278,378 entitled SYSTEM AND METHODS FOR BRIDGING A USB CONNECTION, filed on Mar. 31, 2006, and U.S. Non-Provisional Patent Application Ser. No. 11/534,600 entitled METHODS AND APPARATUS FOR BRIDGING AN AUDIO CONNECTION, filed on Sep.. 22, 2006, both incorporated herein by reference in their entirety.

FIELD OF THE INVENTION

The present invention relates broadly to apparatus and methods for managing a graphical user interface. More specifically, apparatus and methods for connecting a graphical user interface including display and peripheral devices to a first host computer system by a network and a second computer appliance such as a phone or personal media device are described.

BACKGROUND

Historic advances in computer technology have made it economical for individual users to have their own computing system which has caused the proliferation of the Personal Computer (PC). Continued advances of this computer technology have made these personal computers very powerful but also complex and difficult to manage. It is therefore desirable to separate the user interface devices, including the display, keyboard, mouse, audio and other peripheral devices from the application processing parts of the computing system. In this configuration, the user interface devices are physically located at the desktop, while the processing and storage components of the computer are placed in a central location. The user interface devices are then connected to the processor and storage components with some method of communication.

An additional trend common to the enterprise environment is the emerging availability of powerful desktop appliances such as IP phones, personal digital assistants (PDAs), personal media players, multi-function mobile phones and other interactive computing appliances that require user input and display functions. Such appliances often have small displays and awkward user interfaces. Moreover, these appliances are not integrated for high productivity in a workplace setting where the user's attention is primarily focused on the computer monitor, keyboard and mouse.

Some user interface integration methods are known to the art. As one example, IP phones may be accompanied by application software such as "Customer Interaction Center®" from Interactive Intelligence that pops up an interactive phone-related display window when the phone rings. These products may also include features such as "click-to-dial" which allow users to interact with telephony applications using a desktop mouse. This class of product is typically supported by sophisticated back office equipment including specialized enterprise server platforms and IP telephony equipment. Even in the case of a simple single user IP phone such as a USB phone or "soft phone", dedicated software is required on the PC to support the application, increasing PC maintenance requirements and introducing processing overheads.

User interface integration may also be found in some video-conferencing systems that share a desktop display between a user's computer and conferencing system. For example, Sony's PSC-TL50 Video Communication system provides a desktop monitor with integrated camera and control panel that supports switching of the system between a video conferencing mode and multitasking mode in which the display flips to supporting a locally connected computer. These systems share display resources by physically switching between different applications running on the PC.

User interface integration may also be found in some thin client systems, such as the Sun Ray product from Sun Microsystems or Remote Desktop Protocol (RDP) from Microsoft. Sun Ray is a frame buffer multiplexer that allow several servers to simultaneously provide display information to a single remote desktop. RDP enables a graphical user interface to be shared between applications operating on a local computer and other applications operating on a remote computer connected by RDP. These products do not integrate directly with desktop appliances.

In summary, existing graphical user interface integration methods do not extend beyond switching between different standard computing applications operating on different computers.

SUMMARY

The present invention enables a Graphical User Interface (GUI) comprising a display and peripheral devices to be shared between a host computer system connected by a network and one or more computing appliances, wherein the appliances may be located local to the display.

Several embodiments of a GUI module and methods of enabling a host computer system and one or more computing appliances to share GUI resources are disclosed. In an embodiment, a display, Human Interface Devices (HIDs) and audio peripherals provide the human interface to a host computer system and an Internet Protocol (IP) phone computing appliance. By using a generic desktop display and HID devices to control the computing appliance, interaction with the appliance is improved. Moreover, in a cost-sensitive embodiment, the computing appliance may be constructed without a display yet still take advantage of interactive features such as display overlays. Unlike existing solutions that require software applications on the host computer to support interaction between input devices and a computing appliance, some embodiments of the disclosed GUI module operate such that the host computer system is agnostic to the computing appliance and no special software or maintenance is required.

Furthermore, the present invention provides methods for switching the focus of a display and peripherals from a host computer interface to a computing appliance interface by enabling appliance-initiated display overlays and selectively directing user input to the appropriate target computer. Unlike a hardwired solution that switches a display between computing resources, the described methods provide automatic prioritized overlay of the appliance user interface. This improves the physical accessibility of a computing appliance, optimizes desktop space and enables a user to maintain attention on a single user interface.

The present invention also describes methods for reserving display areas for computing appliances. In an embodiment, a configurable appliance sidebar window is reserved within a desktop application framework. Unlike existing computer sidebar applications which provide an interface to applications on a host computer system or a portal to other computer systems, the methods described provide an active interface to the computing appliance even when the host computer is non-operational.

In summary, the present invention provides many improvements to the enterprise remote desktop and introduces innovative concepts to the broader market encompassing computing appliances.

Other features and advantages of the present invention will become apparent from reading the following detailed description, when considered in conjunction with the accompanying drawings, in which:

DETAILED DESCRIPTION

In the following detailed description of the present invention, methods and apparatus for managing a shared Graphical User Interface (GUI), numerous specific details are set forth to provide a more thorough description of embodiments of the invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
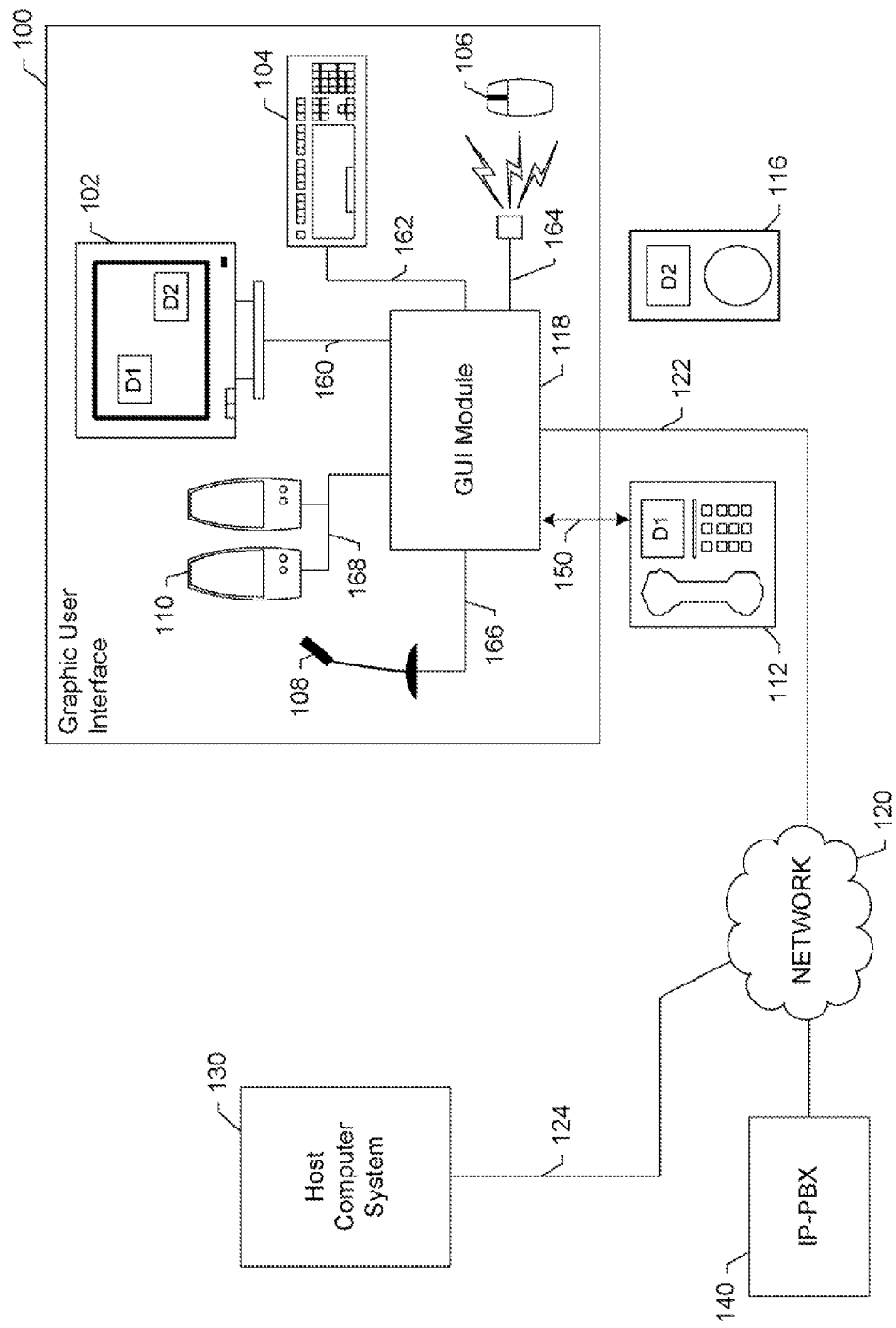
FIG. 1 is an illustration of a graphical user interface system shared between a host computer system and a plurality of computing appliances.

FIG. 1 is a diagram of an embodiment of a GUI system used by a plurality of computers. In the embodiment shown, GUI system 100 has display 102, wired and wireless peripherals including Human Interface Devices (HIDs) and audio devices microphone 108 and speaker set 110. HIDs include keyboard 104 and mouse 106. The peripherals shown in FIG. 1 are presented as examples of a broader set of devices commonly used with modern GUI systems. Other embodiments are contemplated with other peripherals including biometric devices, printers, scanners or other peripheral devices compatible with a computer peripheral bus such as wired or wireless USB, Firewire™, Bluetooth® or other suitable peripheral bus.

Display 102 is connected to GUI module 118 by video bus 160. Digital embodiments of bus 160 include Digital Visual Interface (DVI), Digital Packet Video Link (DPVL), DisplayPort™, Net2Display™ or High Definition Multimedia Interface (HDMI). Analog embodiments include Video Graphics Array (VGA) and S-Video. Keyboard 104 is connected to GUI module 118 by peripheral bus 162. In an embodiment, bus 162 is a USB bus. In another embodiment, bus 162 is a Firewire™ bus. Other suitable buses such as PS/2 may be used. Mouse 106 is connected to GUI module 118 by peripheral bus 164. In an embodiment, bus 164 is a USB bus with a wireless USB transceiver. In another embodiment, bus 164 is a direct USB connection to the mouse. In another embodiment, bus 164 is a Firewire™ bus. Other suitable buses such as PS/2 may be used. Microphone 108 is connected to GUI module 118 by input audio bus 166. In an embodiment, audio bus 166 is a standard audio jack. In other embodiments, other computer audio connections such as SPDIF or Pluggable HD audio are contemplated. Speaker set 110 is connected to GUI module 118 by output audio bus 168. In an embodiment, audio bus 168 is a standard output audio jack. In other embodiments, other output computer audio connections such as SPDIF or Pluggable HD audio are contemplated. Other embodiments of GUI module 118 incorporate other peripheral interface types such as Bluetooth, Ultra Wideband (UWB), 802.11 variants or other interfaces suitable for a GUI environment. Other embodiments may also have fewer or more peripheral buses than those shown in the embodiment of FIG. 1.

In an embodiment, GUI system 100 has wired connection 150 to computing appliance 112 and a wireless connection to computing appliance 116. In the present specification, a "computing appliance", or "appliance" is defined as a device that uses resources associated with GUI system 100, including display resource 102 and optionally other peripherals such as HID resources. In an embodiment, computing appliance 112 is an IP phone and computing appliance 116 is a personal media device such as an MP3 Player. Appliances 112 and 116 incorporate integrated display functions but embodiments without integrated displays are also contemplated. Furthermore, the embodiment shows two appliances as an example. Other embodiments have a different number of appliances. Note that while a computing appliance is defined as one that uses GUI resources, some GUI appliances may have operational modes that rely on GUI resources and other operational modes that operate independent of GUI resources. For example, one embodiment of an IP phone has an integrated display function and the phone is capable of operation both in conjunction with display 102 and in the absence of display 102.

In an embodiment, connection 150 provides communicative coupling with one or more computing appliances. In one embodiment, signals associated with connection 150 are directed across a computer expansion bus such as PCI-Express™ bus. In another embodiment where GUI module 118 is integrated inside an appliance such as a phone, connection 150 is directed across an embedded bus. In another embodiment, connection 150 is directed across a local network connection such as an Ethernet connection.

GUI module 118 provides inter-working functions that enable elements of GUI system 100 to connect to network 120 in addition to functions that enable appliances 112 and 116 to use display 102 and other peripherals such as mouse 106, keyboard 104, microphone 108 or speaker set 110. An embodiment of GUI module 118 is described in FIG. 2.

GUI system 100 is connected to network 120 by network connection 122. In an embodiment, connection 122 is an IP over Ethernet connection. Wireless, cable, digital subscriber line (DSL) or embodiments using other transport layer technologies are suitable alternatives. Network 120 provides communicative coupling between GUI system 100 other networked components, including host computer system 130. In an embodiment, network 120 is a reliable network such as an IP-based Local Area Network (LAN) used in a corporate environment or a Wide Area Network (WAN), as might be deployed between an application service provider such as an Internet Service Provider (ISP) and a set of residential application users.

Figure 10:
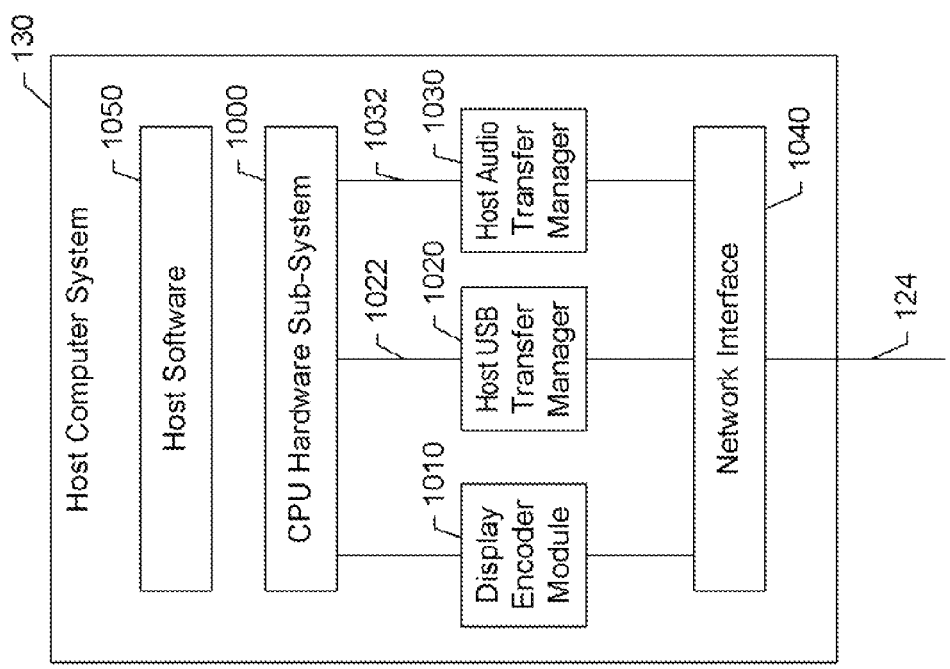
FIG. 10 illustrates a host computer system comprising software and hardware structures.

Host computer system 130 comprises software and hardware for delivery of GUI services to GUI system 100. In an embodiment, computer system 130 is a blade PC In another embodiment, computer system 130 is a computer server. These include blade PC or server products such as blade PC products manufactured by Dell, IBM or HP corporations. Computer system 130 connects to network 120 by connection 124. In an embodiment, connection 124 is an IP over Ethernet connection but other embodiments use other transport layer technologies such as a DSL or wireless connections. An embodiment of host computer system 130 is shown in FIG. 10.

In some embodiments, a computer appliance may be supported by other equipment connected to network 120. For example, in an IP phone embodiment, the phone is supported by IP-PBX 140 which delivers telephony services to the desktop.

Figure 2:
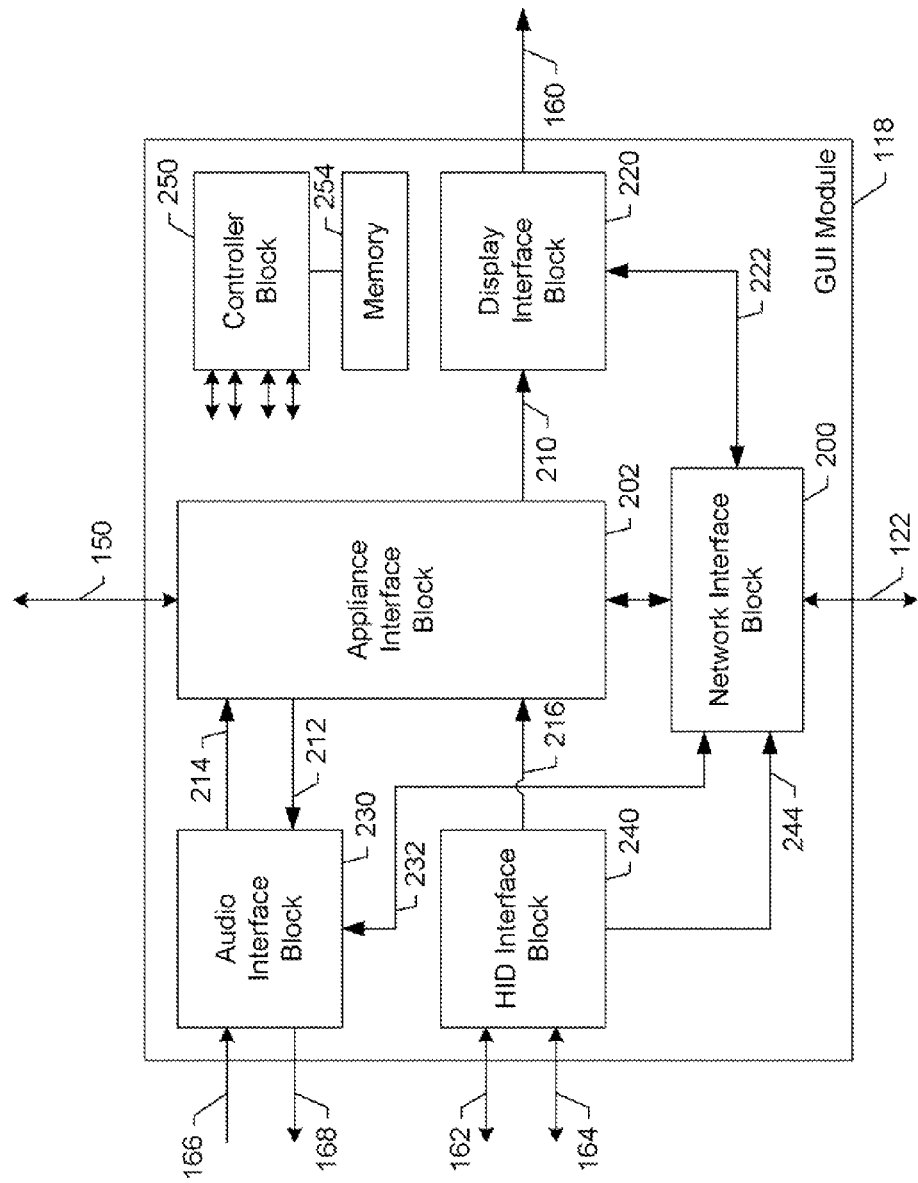
FIG. 2 illustrates a functional block diagram of a graphical user interface module.

FIG. 2 is a functional block diagram of an embodiment of GUI module 118 in FIG. 1. Module 118 may be implemented using Field Programmable Gate Array (FPGA), Application Specific Integrated Circuit (ASIC), discrete components or similar technology. In an FPGA or ASIC embodiment, the functional blocks shown are implemented as a combination of logic circuits, registers and other memory structures interconnected by one or more data, address or control buses using architectures such as the Advanced Microprocessor Bus Architecture (AMBA®) or similar bus structures. Module 118 also comprises memory 254 to store data such as configuration data, variable data, computer-executable instructions and other information. Memory 254 comprises any one or combination of volatile computer readable media (e.g., random access memory (RAM), such as DRAM, SRAM, etc.) and nonvolatile computer readable media (e.g., ROM, hard drive, tape, CDROM, DVDROM, magneto-optical disks, EPROM, EEPROM, Flash EPROM etc.). Moreover, memory 254 may incorporate electronic, magnetic, optical, and/or other types of storage media. While FIG. 2 shows a single memory resource connected to controller block 250, memory 254 may comprise a combination of internal and external memory resources distributed and accessible to multiple functional blocks. Other external components such as power supplies and power regulation components, crystals, filter components, bus drivers and other components may also be present. The internal and external physical structure associated with the integration of functional blocks in an FPGA or an ASIC embodiment is known to the art. These physical structures are assumed integral to the present invention and have been omitted from FIG. 2 as not to obscure aspects of the present invention.

In an embodiment, GUI module 118 manages switching of user interface resources (such as display and input devices) between computer system 130 (ref. FIG. 1) and one or more computing appliances such as appliance 112 or 116 in FIG. 1. In the embodiment illustrated in FIG. 2, a controller is present to control the configuration of display, HID and audio interfaces, monitor for switching events, distribute HID I/O to a host computer system or an assigned computing appliance and optionally direct network traffic between network equipment and one or more computing appliances.

Referring to FIG. 2, network interface block 200 provides physical and network layer connection 206 between peripherals connected to GUI module 118 and network 120 (ref FIG. 1). In an embodiment, network interface block 200 also routes control information between the different functional blocks comprising GUI module 118.

Appliance interface block 202 provides physical connections to computing appliances such as appliance 112 in FIG. 1. Block 202 provides a path for data between one or more computing appliances and the network such a connection between an IP phone and IP-PBX elsewhere in the network. In an embodiment, appliance connection 150 comprises an aggregated set of I/O signals, including display output signal 210 to display interface block 220, audio output signal 212 and audio input signal 214 to audio interface block 230, and selective HID signal 216 from HID interface block 240.

Display interface block 220 decodes display signals 222 from computer system 130 in FIG. 1 and display signal 210 associated with one or more computing appliances. In an embodiment, block 220 renders an image in a local frame buffer and overlays the appliance-related display information as determined by switchover events. The composite display image is then transmitted over video bus 160. An embodiment of display interface block 220 is described in FIG. 3.

HID interface block 240 terminates peripheral buses 162 and 164 to one or more HIDs such as mouse keyboard, biometric devices, webcam or other HIDs. In an embodiment, block 249 provides a USB bus controller, root hub and PHYs to terminate multiple USB buses. Other embodiments comprise other bus controllers and physical termination circuitry to terminate other types of peripheral buses. An embodiment may comprise multiple bus controllers of different types to simultaneously support different bus types.

HID interface block 240 selectively routes HID events to the host computer system or an active computing appliance (signal 216) as instructed by controller block 250. Embodiments of HID interface block 240 are described in FIG. 4 and FIG. 5.

Audio interface block 230 terminates input audio bus 166 and output audio bus 168. Other embodiments may have no audio interface, input only, output only or a different number to those shown in FIG. 2 to terminate one or more audio devices such as microphone, speakers, handset or headset. In an embodiment, audio streams are directed to the host computer via network interface block 200 as bridged audio signal 232. In another embodiment, some audio signals are redirected to appliance interface block 202 as input audio signals 214 and output audio signal 212. An embodiment of audio interface block 230 is detailed in FIG. 8.

In an ASIC or FPGA embodiment of GUI module 118, controller block 250 is a suitable embedded processor such as a MIPS Reduced Instruction Set Computer (RISC) from MIPS Technologies, an ARM RISC from ARM Limited or other suitable embedded microprocessor known to the art. In a discrete embodiment, controller block 250 is any suitable microcontroller or microprocessor known to the art such as microcontroller or microprocessor products manufactured by AMD, Intel, Motorola or other manufacturers.

Figure 7:
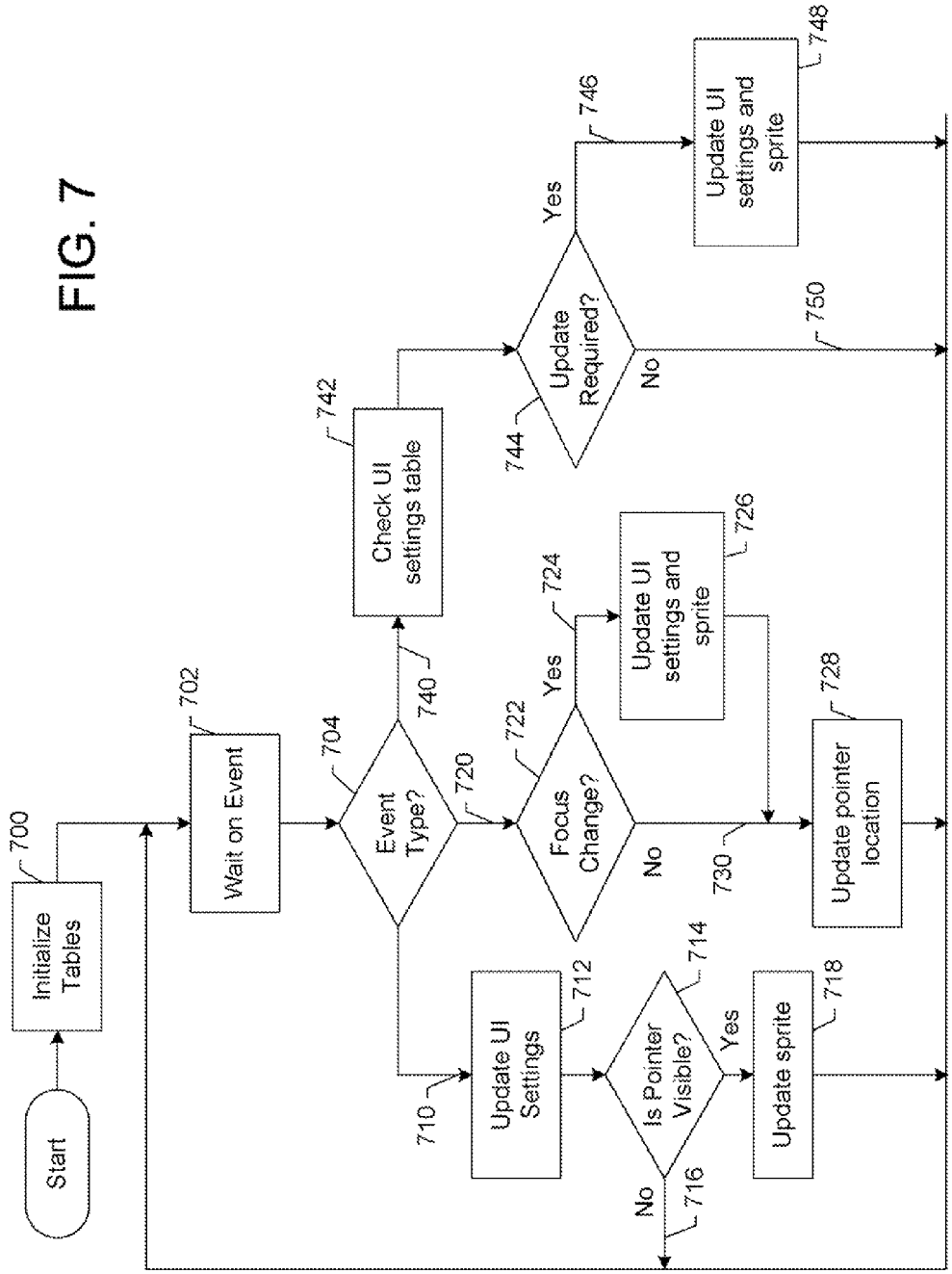
FIG. 7 is a flowchart illustrating an event driven method for analyzing computing appliance events, user input commands and pointer information changes as a precursor to updating user interface settings.

In an embodiment, controller block 250 maintains a User Interface (UI) settings table defining current display and audio settings in addition to settings defining the behavior of HIDs in the context of host computer and computing appliances operation. Input events such pointer location changes, sprite updates, appliance events (e.g. telephony events) or events from a host computer are received from an HID, appliance or the host computer. GUI system 100 responds to the events based on UI settings and the operational state of the host computer system and computing appliances Controller block 250 may also update UI settings based on the current status and input events. A method for analyzing and updating the UI settings is shown in FIG. 7.

Controller block 250 exchanges control information with the interface blocks so that active user settings are maintained. In an embodiment, switching events are received from HID interface block 240 or appliance interface block 202. In another embodiment, pointer information is received from HID interface block 240, the host computer system, or appliance interface block 202. In another embodiment, configuration information is received from the host computer system. In another embodiment, controller block 250 transmits selective pointer information to display interface block 220. In another embodiment, controller block 250 transmits instructions to HID interface block 240 or audio interface block 230.

Figure 6:
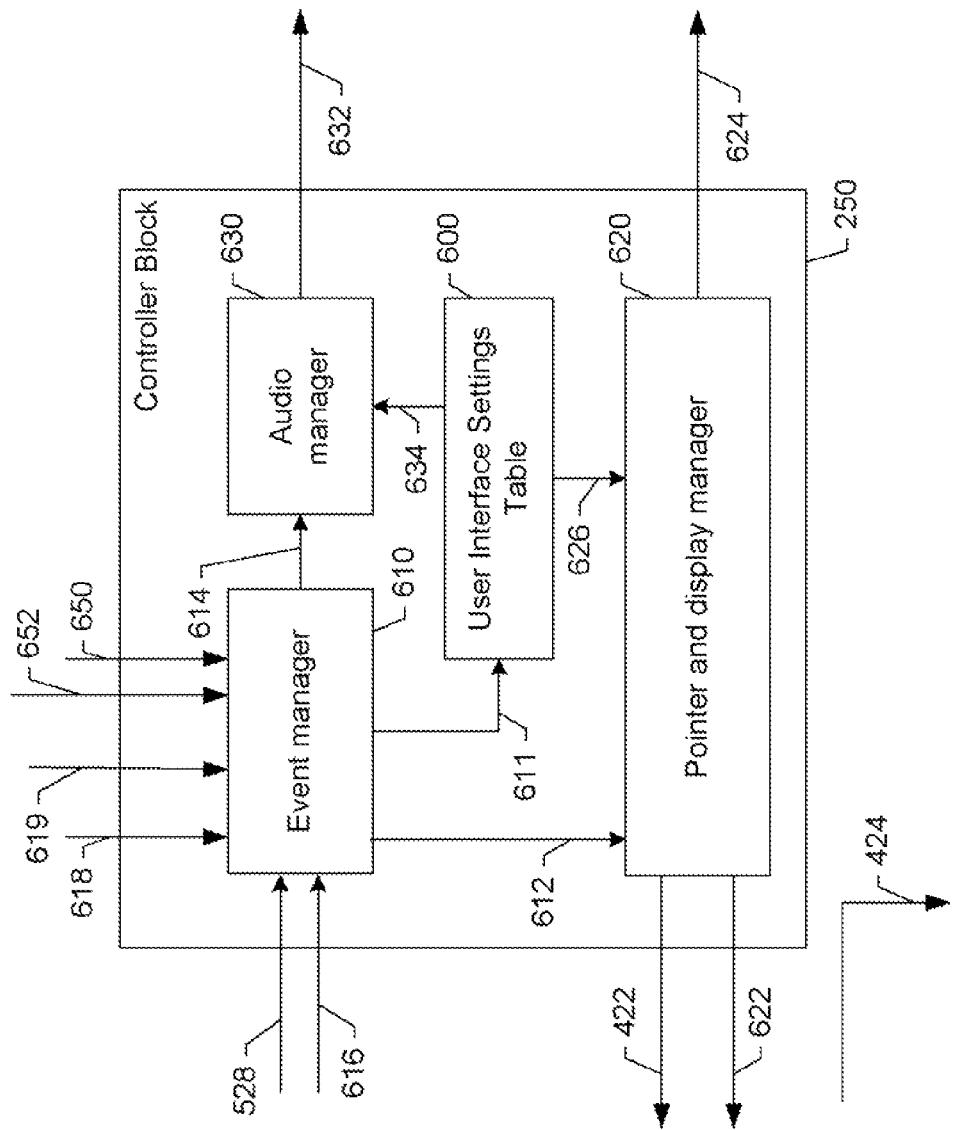
FIG. 6 illustrates a controller functional block that coordinates the switchover of user interface signals from a host computer system to a computing appliance.

In an embodiment, controller block 250 is also responsible for system management tasks associated with GUI module 118. Management tasks include initialization of functional blocks, local buses, memory, external interfaces and other components if present. In an embodiment, control block 250 establishes a management connection with host computer system 130 in FIG. 1 to enable communication of status updates, error conditions and peripheral device information. An embodiment of controller block 250 is illustrated in FIG. 6.

Figure 3:
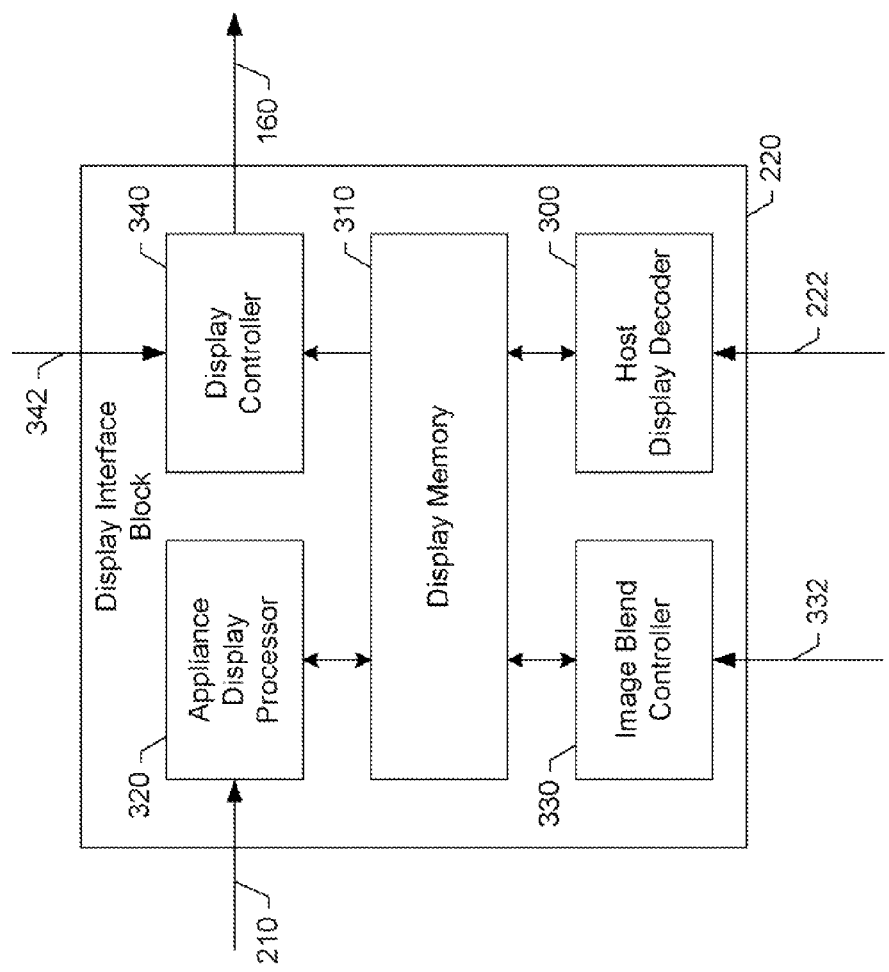
FIG. 3 illustrates a display interface block comprising display memory shared by a host computer system and one or more computing appliances.

FIG. 3 shows an embodiment of a display interface block. In an embodiment, display interface block 220 comprises display memory 310 shared by a host computer system such as computer system 130 in FIG. 1 and one or more computing appliances such as appliances 112 or 116, also in FIG. 1.

In an embodiment, display memory 310 is a memory structure comprised of multiple frame buffers. It stores image information related to a host computer system and one or more computing appliances (each of which may occupy multiple frame buffers). Encoded display signal 222 from the host computer system (ref system 130 in FIG. 1) is decoded and stored in display memory 310.

Display information from a computing appliance is also stored in display memory 310. In the presence of an activated display overlay, display information associated with the computing appliance is combined with primary display information associated with the host computer system and displayed. In an alternative embodiment, display memory 310 may include drawing memory to allow active rendering of a display image based on drawing commands received from a computing appliance.

Host display decoder 300 receives display information from computer system 130 (ref FIG. 1). In an embodiment, display information is received as encoded image update information and decoder 300 performs inverse lossy or lossless transform of the images using inverse methods corresponding with encoding methods adopted by the host computer system. An embodiment of a host computer system comprising a display encoder module is described in FIG. 10.

In an embodiment, appliance display processor 320 receives bitmaps as signal 210 from a computing appliance and stores them in display memory 310. In an alternative embodiment, appliance display processor 320 receives drawing commands from the computing appliance and renders one or more images in display memory 310. In an embodiment, image blend controller 330 combines host and appliance display images in an output frame buffer, using overlay ordering and alpha blending parameters 332 based on UI settings provided by controller block 250. In an alternative embodiment, overlay is performed at display refresh time by display controller 340 which accesses different images from different frame buffers. In one such embodiment, image blend controller 330 controls display controller 340. Display controller 340 accesses either an output frame buffer or multiple frame buffers and generates a display signal compatible with video bus 160 described. Pointer location and sprite information 342 are provided by controller block 250 as programmed registers or via a shared table.

In an embodiment, display interface block 220 overlays display information associated with a wireless computing appliance such as a PDA, phone, media player or other wireless computing appliance. In an embodiment a wireless computing appliance comprises both a local display sub-system to support an integrated display and a remote display processor which generates graphic commands or bitmap information for transmission to display interface block 220 using a suitable transceiver system known to the art. In an embodiment, GUI module 118 (ref. FIG. 1) and the computing appliance have wireless transceivers capable of Bluetooth, 802.11, UWB or other wireless communications. The computing appliance then uploads display information to appliance display processor 320. In an embodiment, a control channel is also established between the computing appliance and processor 320 (or controller block 250 in FIG. 2) to set the configuration preferences synchronize communications and manage communications.

Figure 4:
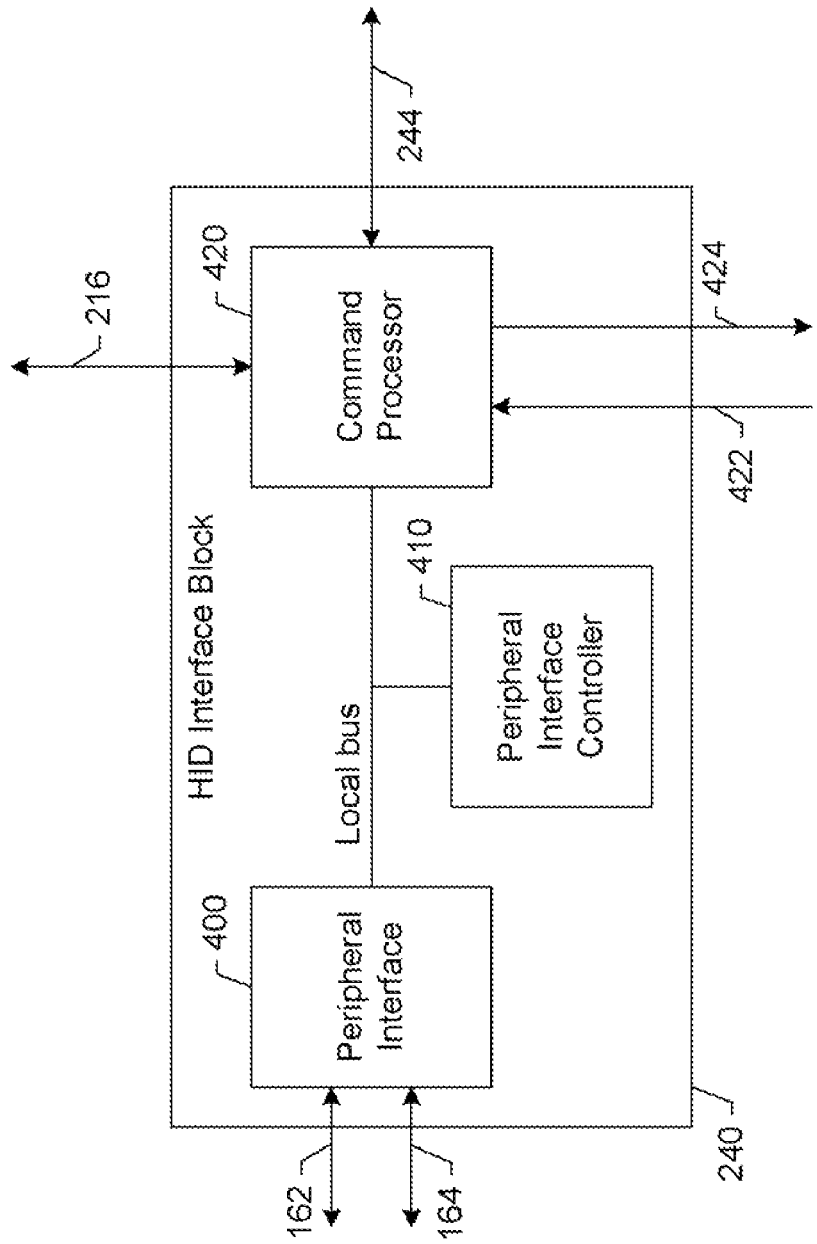
FIG. 4 illustrates an HID sub-system that selectively directs input device data to a host computer system and/or one or more computing appliances.

FIG. 4 illustrates an embodiment of HID sub-system 240 in FIG. 2 that selectively directs input device data to a host computer system and/or one or more computing appliances. Peripheral interface 400 terminates peripheral buses 162 and 164 including implementing a physical interface comprising bus transceiver logic and lower layer protocol termination for one or more buses. One example of interface 400 is a USB interface.

In an embodiment, peripheral interface controller 410 is a bus controller with bus-specific state machines and bus protocol stack capable of processing descriptor lists generated by a host controller driver, for example meeting compatibility requirements specified in USB 2.0, Enhanced Host Controller Interface (EHCI), Open Host Controller Interface (OHCI), Firewire, Bluetooth or other relevant peripheral bus and interface specifications. In one USB embodiment, controller 410 is a OHCI/EHCI USB controller known to the art.

Command processor 420 executes peripheral bus drivers and processes HID-related instructions from the host computer system or controller block 250 in FIG. 2. In a USB embodiment, processor 420 executes a Host Controller Driver (HCD), core drivers, hub drivers to convert high level device events from the host computer system to descriptor-level instructions executable by controller 410 or inbound descriptor-level instructions to high level device events that may be interpreted by a host computer or appliance. High level device events include bus independent events supported under the T.120 framework or similar products such as Remote Desktop Protocol (RDP) for Microsoft or ICA from Citrix. Examples of device events include pointer movement commands, keyboard or mouse input events (including hotkey events) or input data from a human interface device such as a webcam or biometric device. In an alternative embodiment, peripheral bus drivers may be executed by controller block 250 in FIG. 2, for example under the control of an embedded operating system such as Windows CE from Microsoft. In an embodiment, command processor 420 receives HID instructions as signal 422 from controller block 250 (in FIG. 2). Signal 422 provides information regarding target destination for high level peripheral input events from a peripheral device. Command processor 420 then routes the input events to the host computer system (as signal 244) or a computing appliance (as signal 216). In an embodiment, pointer movement and hotkey information is routed to controller block 250 in FIG. 2. These signals are monitored as triggers for switchover events described in FIG. 7 to enable user interface signal switching between a host computer system and one or more computing appliances.

In an embodiment, pointer movement signal 424 is routed to computer system 130 (ref FIG. 1) where an industry compatible pointer driver generates pointer location information. This location information is returned to controller block 250 (in FIG. 2) for distribution to display interface block 220 and one or more computing appliances. In one alternative embodiment, pointer movement is terminated by command processor 420 and pointer location information is passed to both the computer system and controller block 250 (ref. FIG. 2) for distribution. This alternative enables the operation of a computing appliance in the absence of the host computer system (ref system 130 in FIG. 1). In another alternative embodiment, controller block 250 (in FIG. 2) interprets and routes all HID information based on UI settings for the host computer and computing appliances. As one example, pointer movement information is re-routed from computer system 130 (ref FIG. 1) to a computing appliance when the computing appliance is active. In this case, the pointer location is reset whenever the displays focus changes. As another example, input events (e.g. mouse clicks) have different contexts based on current display focus, as determined by settings maintained by controller block 250 (in FIG. 2).

Figure 5:
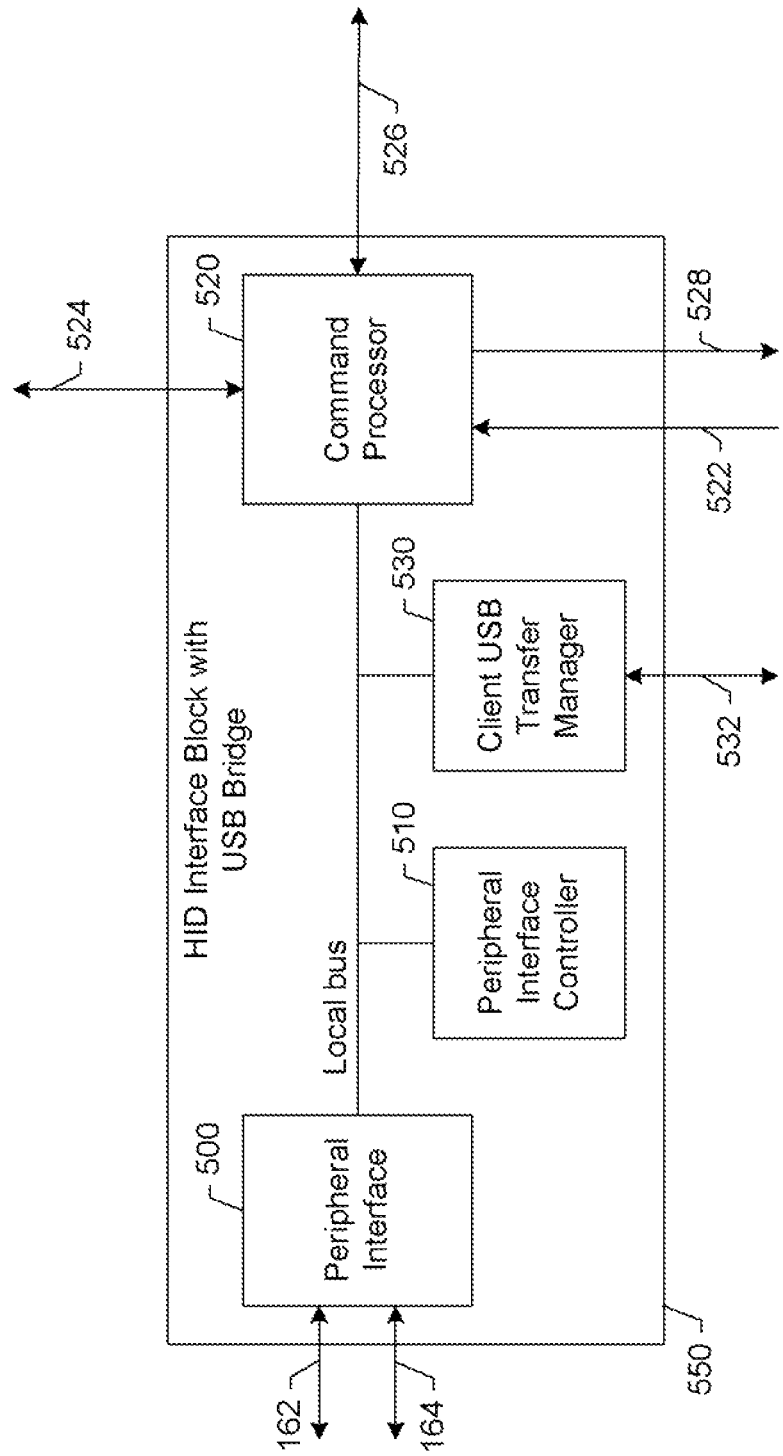
FIG. 5 illustrates an alternative embodiment of an HID interface functional block that enables bridging of bus-dependent peripheral bus transactions and data.

FIG. 5 shows an alternative embodiment of HID interface block 240 described in FIG. 4. While block 240 in FIG. 4 terminates bus independent events from a host computer system by executing bus drivers and a T.120 or similar framework, HID interface block 550 shown in FIG. 5 enables bridging of bus-dependent peripheral bus transactions and data. In an embodiment, block 550 bridges a USB connection across a network. This enables a host computer system to communicate with USB devices using industry compatible USB device drivers rather than requiring input command processing software such as Microsoft Terminal Services at the host computer system. The detailed structure of one example of a bridged USB connection is described in U.S. patent application Ser. No. 11/278,378, filed on Mar. 31, 2006, which is incorporated herein by reference herein in its entirety. In the embodiment shown in FIG. 5, peripheral interface 500 and peripheral interface controller 510 provide termination for buses 162 and 164. In an embodiment, interface 500 and controller 510 have substantially similar enablement details to interface 400 and controller 410 in FIG. 4.

Command processor 520 executes peripheral bus drivers and processes HID-related instructions from the host computer system or controller block 250 in FIG. 2. In a USB embodiment, processor 520 executes a Host Controller Driver (HCD), core drivers, hub drivers to convert selective descriptor-level commands from peripheral interface controller 510 into high level peripheral input events which are forwarded to a computing appliance or host computer system.

HID instruction signal 522 from controller block 250 in FIG. 2 is substantially similar to instruction signal 422 described in FIG. 4 and provides information to input command processor 520 regarding target destinations for high level peripheral input events. Input command processor 520 then routes the input events as directed. In an embodiment, processor 520 routes input events to a computing appliance as signal 524 (substantially similar to signal 216 in FIG. 2) or the host computer system as signal 526 (substantially similar to signal 244 in FIG. 2). In one embodiment, selective pointer information such as HID events and hotkey information are routed to controller block 250 in FIG. 2 as signal 528.

In an embodiment, input commands from a peripheral device destined for the host computer system are forwarded to client USB transfer manager 530 where they are encoded as bus-dependent descriptor commands for transfer to computer system 130 (ref FIG. 1). In another embodiment, input commands from a peripheral device destined for the host computer system are routed directly from peripheral controller 510 to transfer manager 530 without first being processed by command processor 520. Bus-dependent descriptor commands and updates are thereby transferred to the host computer system without a need for intermediate protocol conversion steps.

Client USB transfer manager 530 operates in conjunction with a corresponding host USB transfer manager in host computer system 130 (ref. FIG. 1) to enable communication of bus-dependent descriptor commands and updates between the two systems as logical connection 532 shown. Transfer manager 530 comprises list processing resources such as DMA controllers and memory including data buffers and list memory for the transfer of data to or from network interface block 200 in FIG. 2. In an embodiment, manager 530 also comprises error handling and timing logic to enable synchronized communications with host computer system 130 in FIG. 1. An embodiment of a host USB transfer manager associated with computer system 130 (ref FIG. 1) and related USB data transfer methods are described in FIG. 10.

FIG. 6 shows an embodiment of a controller block that coordinates the switching of user interface signals from a host computer system to a computing appliance. In an embodiment, controller block 250 uses switching events, pointer location changes and sprite updates as triggers to update UI settings tables which provide display, audio and user input parameters and priorities related to the current user interface and display. Changes in UI settings tables affect the user interface sub-systems, including display interface block 220, audio interface block 230 and HID interface block 240, all referenced in FIG. 2.

A method for analyzing events and updating UI settings is described in FIG. 7. Other embodiments of controller block 250 are also contemplated. For example, different segregation of management tasks, different definitions for UI settings and different methods for accessing UI settings are a few alternatives provided by alternative embodiments.

Referring to FIG. 6, UI settings table 600 stores current and previous parameters as well as default settings associated with each host user interface. Parameters associated with specific hosts include window location, sprite, volume settings, trigger events etc. Integration settings relating to the concurrent existence of multiple active hosts are also stored. These integration settings include current overlay priority, current alpha channel characteristics, current audio mix, current pointer location and sprite combinations, etc. In one embodiment, default settings are stored in the controller block and accessible for update by computer system 130 (ref. FIG. 1). For example, the host computer system may determine operational configuration after initialization or change the default UI settings.

In another embodiment, a computing appliance or other system on the network may determine operational configuration in the absence of computer system 130 (ref FIG. 1). In another embodiment, a computing appliance may be able to adjust it's own default settings when active. Other embodiments are contemplated. In an embodiment, changes to UI settings table 600 are initiated by event manager 610. In an alternative embodiment, display focus changes are initiated by pointer and display manager 620.

In an embodiment, event manager 610 initializes UI settings, continuously updates pointer position and periodically changes other UI settings as settings adjustment signal 611 shown. Event manager 610 compares current pointer location to display-boundary coordinate settings. When the current pointer location crosses a boundary, a settings change event is signaled (see Table 1). In an alternative embodiment where audio settings are unaffected by pointer location, it may be convenient to locate the comparison function in pointer and display manager 620.

Display changes (e.g. appliance-related pop-ups or window position changes) and other updates to current settings are driven by various events, examples of which are provided in Table 1. These include switching events from a computing appliance as signal 616, optional switching events (including HID events or hotkey information) from HID interface block 240, previously referenced as signal 528 in FIG. 5, pointer information from computer system 130 (ref FIG. 1) as signal 618 and optionally host computer events as signal 619. Event manager 610 monitors these events and changes UI settings accordingly.

TABLE 1

Event Types and Examples

| Event | Examples |
| --- | --- |
| Appliance activation event | Ring or off-hook events from IP phone |
| Appliance deactivation event | Disconnect event from IP phone |
| HID event | Hotkey combination from keyboard |
| Pointer location change | Driver signal from host computer system |
| Sprite update | Driver signal from host computer system |
| | Driver signal from appliance |
| User-modified window | Host notification of window dragging or scaling |
| Pointer boundary change | As calculated by the event manager |

Events such as those listed in Table 1 serve as triggers that launch appliance-related display windows, change current audio settings and optionally other UI settings changes according to the method embodiment described in FIG. 7. After receiving an event, event manager 610 updates the current UI settings, updates display manager 620 using signal 612 and updates audio manager 630 using signal 614.

In an embodiment, pointer and display manager 620 receives event notification and information from event manager 610. Manager 620 determines the current display focus and target for HID events such as keystroke events and mouse button clicks. Event information includes pointer location changes, sprite changes, appliance-related events and boundary changes. In an embodiment, the focus of the display is directly related to pointer location and boundary changes. In another embodiment, the focus is indirectly related based on UI settings. For example, in an embodiment, a low priority display pop-up does not become the focus when the pointer moves over it's related area. In an embodiment, manager 620 provides display interface block 220 (ref FIG. 2) with updated pointer co-ordinates, sprite information and overlay information as signal 624. In another embodiment, block 220 (ref. FIG. 2) accesses this information directly from table 600. In an embodiment, manager 620 accesses UI settings available as signal 626 and provides a computing appliance with updated pointer coordinate and sprite information as signal 622 when the computing appliance is initialized or comes into focus. In another embodiment, a computing appliance receives an event signal and access the information directly from table 600.

In an embodiment, manager 620 instructs the HID interface block as to current target of HID events using signal 422 previously described. In different embodiments, the selected target is based on pointer location, current display focus and/or other UI settings.

In an embodiment, audio manager 630 access audio settings as signal 634 and provides audio interface block 230 (ref. FIG. 2) with channel control instructions as signal 632 based on appliance switching events, HID events e.g. hotkeys and optionally based on pointer location or display focus changes. In an embodiment, audio settings in table 600 are configured by computer system 130 (ref FIG. 1) as signal 650. In another embodiment, audio settings in table 600 are configured by a computing appliance as signal 652. In an embodiment, the updates are managed by event manager 610 but alternative embodiments where updates are managed by audio manager 630 or other modules are also contemplated.

FIG. 7 is a flowchart of an event driven method for analyzing computing appliance events, user input commands and pointer information changes as a precursor to updating UI settings. In an embodiment, the method shown in FIG. 7 is executed by event manager 610 which monitors events and updates settings as previously described in FIG. 6.

As a first step 700, UI settings are initialized. In an embodiment where UI settings comprising display, audio configuration and HID ownership settings are maintained in table 600 (ref. FIG. 6), table 600 is initialized. In one embodiment, user interface resources are allocated to computer system 130 (ref FIG. 1) after initialization. In another embodiment, user interface resources are allocated to a computing appliance such as appliance 112 (ref FIG. 1) after initialization.

As next step 702, the method waits for sprite updates, pointer location changes or switching events. In an embodiment, event manager 610 (ref. FIG. 6) monitors pointer information and computing appliance 112 in FIG. 1 for events.

When an event is received, the event type is analyzed as a next step 704. In case 710, a sprite update is received so settings are updated as a next step 712. The pointer visibility is then evaluated as step 714. In case 716, the pointer is not visible so event manager 610 (ref. FIG. 6) returns to wait state 702. If the pointer is visible, the sprite is updated as step 718 and the method shown returns to wait state 702. In an embodiment, step 718 further comprises notifying manager 620 in FIG. 6.

In case 720, a pointer location change event occurs so the new pointer location is compared with the current display focus as step 722. In case 724, a boundary is crossed and the display focus changes so current settings and sprite are updated as step 726. In an embodiment, these include a new overlay order, different audio settings, and the determination of a new target for HID events.

As a next step 728, the pointer location is updated. In an embodiment, manager 620 (ref. FIG. 6) is also signaled. In another embodiment, audio manager 630 (ref. FIG. 6) is also signaled if audio settings have changed. The method then returns to wait state 702. In case 730, the pointer focus remains unchanged, so pointer location is updated 728 and the method shown returns to wait state 702.

In case 740 an appliance-related event is received. Appliance events include appliance display initiation and teardown events, appliance settings changes (e.g. audio volume) and HID events that affect appliance status.

As a next step 742, actions associated with appliance events for the current settings are determined. In an embodiment, UI settings table 600 (in FIG. 6) maintains a set of parameters which determine actions associated with appliance events. As one example, a parameter instructs the user interface to change focus. As another example, a parameter defines the display overlay ordering in the event of an appliance event. As another example, a parameter defines audio settings dependent on the state of display overlays (e.g. position and priority).

As a next step 744, the priority of the event is evaluated in relation to other queued events and current UI settings to determine if an update is required. In an embodiment, high priority events result in an immediate change in settings while lower priority events are queued or ignored. In case 746, a settings update is required, so UI settings are updated as a next step 748. In one embodiment, new overlay settings are determined. In on embodiment, the level alpha blending associated with display overlays is adjusted based on the priority of the overlay. In other embodiments, a new sprite, audio settings or new HID event target is determined. In an embodiment, manager 620 (ref. FIG. 6) is signaled. In another embodiment, audio manager 630 (ref. FIG. 6) is signaled if audio settings have changed. The method then returns to wait state 702. In case 750, no update is required so the method returns to wait state 702.

Figure 8:
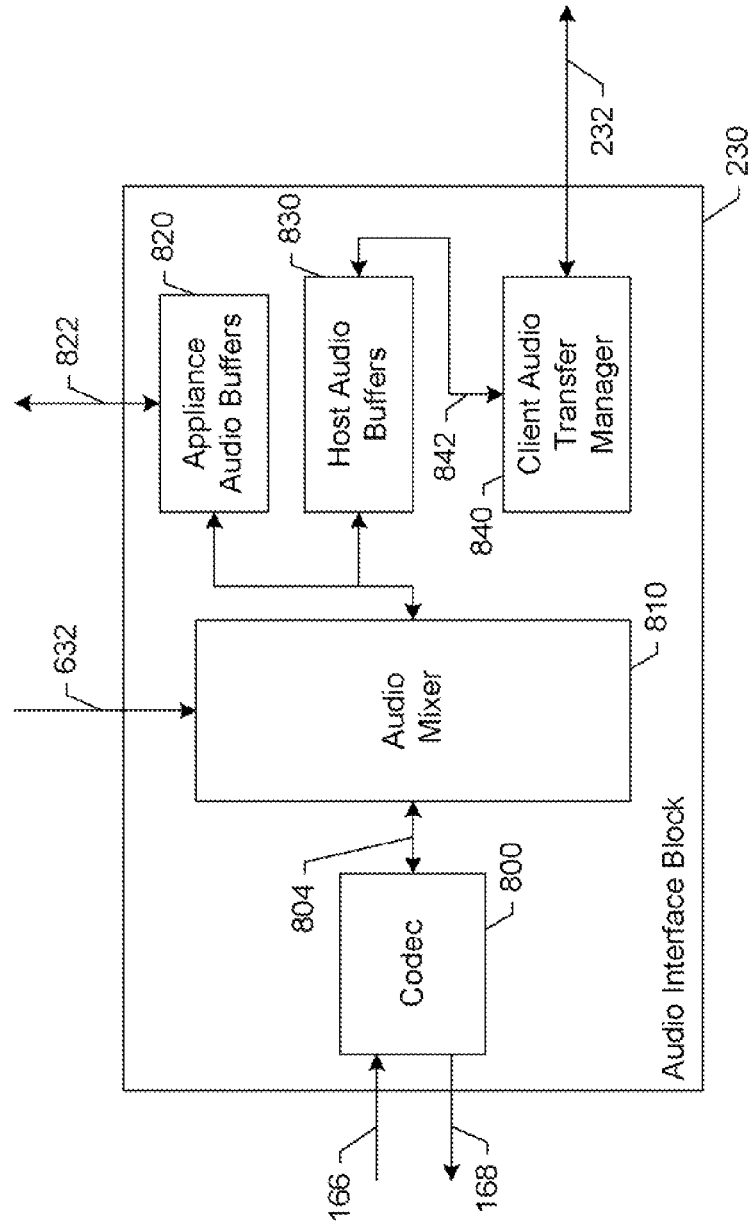
FIG. 8 illustrates an audio interface functional block that selects an audio configuration associated with a host computer system, a computing appliance or a mixed audio configuration based on audio channel control instructions.

FIG. 8 shows an embodiment of an audio interface block that selects an audio configuration associated with a host computer system, a computing appliance or mixed audio configuration based on audio channel control instructions. In an embodiment, a computing appliance shares input and output audio resources including microphone 108 and speaker set 110 with a host computer system. In some embodiments, a computing appliance has additional independent audio resources such as a phone handset with microphone and speaker. Table 2 shows selective audio configurations and examples using host computer and appliance audio resources.

TABLE 2

| Example Audio Configurations | |
|---|---|
| Configuration | Application Example |
| Appliance input audio redirected to host computer input audio | Phone handset microphone redirected to GUI microphone |
| Host computer input audio redirected to appliance input audio | GUI microphone redirected to phone handset microphone |
| Appliance output audio redirected to host computer output audio | Phone handset speaker redirected to GUI speaker |
| Host computer output audio redirected to appliance output audio | GUI speaker redirected to phone handset speaker |
| Host computer audio output mixed with appliance input audio | Audio presentation |
| Appliance audio output duplicated to host computer audio input | Call monitor or record function |
| Appliance audio output mixed with host computer audio output | Speakerphone function that mutes default host computer audio output |

Referring to the embodiment shown in FIG. 8, audio interface block 230 comprises audio codec 800 which terminates input audio bus 166 and output audio bus 168. In another embodiment, independent codecs are used to terminate input and output audio buses. In other embodiments, audio interface 230 has a different number of audio buses and configurations (mono, stereo, multi-channel etc.) to those shown in FIG. 8. Audio mixer 810 terminates audio bus 804 from codec 800. Examples of audio bus 804 include High Definition (HD) audio or AC'97 audio buses In an embodiment, mixer 810 comprises packet and frame timing domains, governed by audio bus and packet timing clocks. The frame timing domain operates at a rate determined by the frame timing requirements of the audio bus.

Audio mixer 810 selects audio data from appliance audio buffers 820 or host audio buffers based on configuration instructions 632 from controller block 250 (in FIG. 2). In an embodiment, audio buffers 820 and 830 store inbound and outbound audio data. Audio mixer 810 accesses the buffers and mixes or redirects any combination of inbound and outbound traffic streams using audio mixing methods known to the art. Audio mixer 810 then streams or writes the mixed signal to a designated target resource.

Connection 822 provides an audio connection to one or more computing appliances. In an embodiment, connection 822 gives an appliance a shared memory interface to audio buffer 820 and the appliance manages audio data access. In another embodiment, data streaming is managed by buffers 820.

In an embodiment, client audio transfer manager 840 terminates audio data connection 232 from a host computer system such as computer system 130 in FIG. 1. Transfer manager 840 operates in conjunction with a host audio transfer manager associated with the host computer system to communicate audio information between block 230 and the host computer in a manner that preserves audio timing and format attributes. The detailed structure of one example of a bridged audio connection is described in U.S. patent application Ser. No. 11/534,600, filed on Sep. 22, 2006, which is incorporated herein by reference herein in its entirety. An embodiment of a host audio transfer manager associated with computer system 130 (ref FIG. 1) and related audio data transfer methods are described in FIG. 10. The advantage of bridged audio connection 232 over a proprietary audio interface is that industry compatible audio device drivers may be deployed at the host computer system (ref. system 130 in FIG. 1).

In an alternative embodiment, audio transfer manager 840 is replaced with a stream processor that sends and receives audio files to/from computer system 130 (ref FIG. 1). The stream processor operates in tandem with an audio stream processor on the host computer system to transfer audio data.

Figure 9:
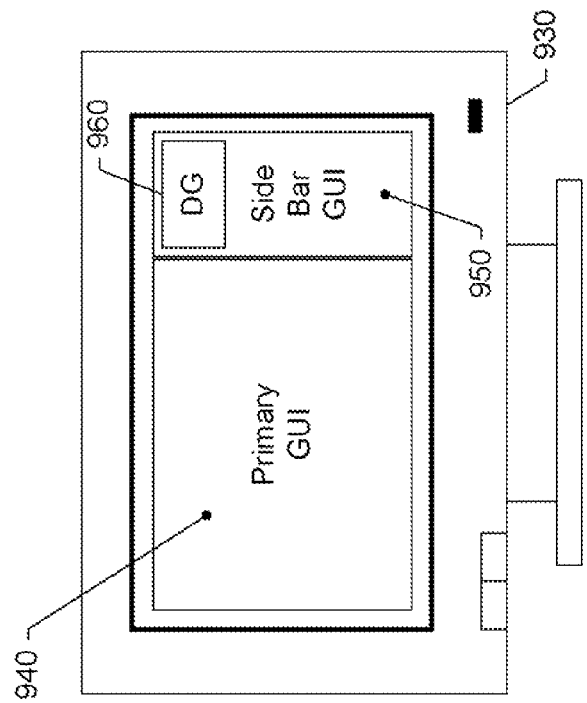
FIG. 9 illustrates a display with an area that is reserved for display information generated by a computing appliance.

FIG. 9 shows a display with a display region that is reserved for display information generated by a computing appliance. In an embodiment, display 930 is connected to a GUI module substantially similar to module 118 in FIG. 1. The GUI is then connected by a network to a host computer system as described in FIG. 1.

In an embodiment, the host computer system comprises a desktop frame work and application software. The desktop framework supports "sidebar GUI" structures such as widgets or gadgets for personalized graphical display applications. Sidebar GUI capabilities are included in products such as Vista Sidebar, Google Desktop, OSX dashboard and Yahoo Widget Engine, all known to the art.

Application software comprises standard applications as might be executed on any host computer and an "Appliance Gadget" sidebar GUI application as supported by the desktop framework.

In an embodiment, standard applications use primary GUI display area 940 of display 930 while sidebar GUI 950 is reserved by the host computer system for sidebar display applications. Sidebar GUI 950 includes reserved display area 960 associated with the appliance gadget sidebar GUI application. In an embodiment, the appliance gadget sidebar GUI application is a plug in application for one of the desktop frameworks listed that reserves a display area of display 930 for appliance display purposes.

In one embodiment, reserved display area 960 is user configurable, for example using a mouse to drag or expand the area. In such an embodiment, the plug-in appliance gadget sidebar GUI application on the host computer system notifies the display manager (ref display manager 620 in FIG. 6) of updated configuration information and the appliance display overlay is adjusted accordingly.

In other embodiments, multiple appliances are associated with multiple appliance gadget sidebar GUI applications. In one alternative embodiment, an appliance gadget sidebar GUI application instantiates multiple reserved display areas for different appliance displays. If the host computer is non-operational, (e.g. as detected by GUI display decoder 300 in FIG. 3), the appliance overlay remains active. In such an embodiment, all HID events might be directed to the appliance rather than the host computer system during periods when the host computer system is inactive.

FIG. 10 shows an embodiment of host computer system 130 comprising software and hardware structures. Host software 1050 includes one or more separate software programs, each of which comprises an ordered listing of executable instructions for implementing logical functions. Examples of such programs include operating system, drivers, application software and other services known to the art.

In an embodiment, hardware structures comprise Central Processing Unit (CPU) sub-system 1000, display encoder module 1010, host USB transfer manager 1020, host audio transfer manager 1030 and network interface 1040. In an embodiment, CPU sub-system 1000 comprises CPU, memory North Bridge, South Bridge, Graphics Processing Unit (GPU), memory controllers, bus bridges and other components known to the art. Examples of a suitable CPU include 32-bit, 64-bit or other CPU such as Opteron™ or Athlon™ class microprocessors manufactured by AMD; Xeon, Pentium or X86 class processors manufactured by Intel; SPARC microprocessors manufactured by Sun Microsystems Inc. or microprocessor such as a PowerPC processor manufactured by Motorola. However, any other suitable microprocessor platforms may be utilized. Memory associated with CPU sub-system 1000 comprises any one or combination of volatile computer readable media (e.g., random access memory (RAM), such as DRAM, SRAM, etc.) and nonvolatile computer readable media (e.g., ROM, hard drive, tape, CDROM, DVDROM, magneto-optical disks, EPROM, EEPROM, Flash EPROM, etc.). Moreover, system memory may incorporate electronic, magnetic, optical, and/or other types of storage media. Memory associated with sub-system 1000 stores host software described. System 130 may also comprise additional components such as mechanical housing components, connectors, power supplies, and other components not shown in FIG. 1 as not to unnecessarily obscure aspects of the present invention.

In an embodiment, display encoder module 1010 is a hardware module that encodes display information after the image has been rendered in a local frame buffer by intercepting the display signal or accessing the frame buffer. In an embodiment, module 1010 uses image transformation and encoding methods known to the art such as lossless encoding (e.g. Portable Network Graphics (PNG)) or lossy encoding (e.g. JPEG2000) to compress the display information prior to communication to GUI system 100. In another embodiment, display encoder module 1010 is a software encoding module.

Network Interface 1040 is a network interface controller sub-system that provides connection 124 to network 120 (in FIG. 1) using suitable network interface controller technologies known to the art.

USB Peripheral Controller Bridge Description

In an embodiment, host USB transfer manager 1020 connects to system bus 1022 of hardware sub-system 1000. For example, in an embodiment, connection 1022 is a Peripheral Component Interconnect (PCI) bus Other embodiments such as PCI-Express are also suitable. In an embodiment, transfer manager 1020 connects to network 120 using network interface 1040. In another embodiment, transfer manager 1020 connects to network 120 using a network interface controller associated with sub-system 1000. Host USB transfer manager 1020 operates in conjunction with client USB transfer manager 530 in FIG. 5 to bridge one or more USB connections between host USB bus drivers and remote USB peripherals such as a USB mouse or keyboard at GUI system 100 in FIG. 1. Transfer manager 1020 presents a set of industry-compatible USB interface functions over bus 1022 to USB bus drivers such as a USB Host Controller Driver (HCD) and higher level USB software including device drivers associated with the supported remote USB devices. In an embodiment, an Open Host Controller Interface (OHCI) is presented to bus drivers executed by sub-system 1000. In another embodiment, an Enhanced Host Controller Interface (EHCI) is presented to bus drivers. Alternative embodiments including OHCI/EHCI and Wireless USB variants are also contemplated. In the case of an OHCI interface, an OHCI USB bridge is established between manager 1020 and manager 530 (ref. FIG. 5) by bridging standard USB-specified communications structures such as the HCCA, descriptor lists and the operational registers (OPR). The bridge is maintained by reflecting changes initiated by either the HCD executed by sub-system 1000 or peripheral interface controller 510 (ref. FIG. 5) at the remote system. Host USB transfer manager 1020 encapsulates outbound updates into packets for communication in addition to performing memory management, de-packetization of host-bound data and processing of inbound update packets. Control information including state information related to the transfer managers and interface controller 510 (ref. FIG. 5) is also communicated between transfer manager 1020 and client transfer manager 530 in FIG. 5. Host USB transfer manager 1020 comprises list search and list processing resources, including DMA resources and list processing memory in addition to registers associated with a industry-compatible USB host controller such as OPR registers. A list processor is assigned to track changes to USB endpoint descriptor (ED) and transfer descriptor (TD) lists using a list shadowing method. As one example of a list shadowing method, transfer manager 1020 periodically scans the descriptor lists maintained by an HCD driver in memory associated with CPU sub-system 1000 using substantially similar methods to methods deployed by a local USB host controller when descriptor lists are traversed to identify changes or implement list updates. Transfer manager 1020 then compares the lists with a set of shadow lists comprising the most recently communicated list information (where the shadow lists are maintained in list processing memory, for example memory internal to transfer manager 1020.

Host USB transfer manager 1020 then transmits information listing the differences between the original descriptor lists in the domain of CPU sub-system 1000 and shadow lists as a sequence of update commands in update packets. TD-related data and register information is also assembled and transmitted, optionally using multiple packets if required. Different descriptor types such as EDs or TDs and different data types such as bulk, control, interrupt or isochronous types may be sent over the network using different transfer queues at different priorities. Host USB transfer manager 1020 also updates the shadow lists to reflect the changes.

Host USB transfer manager 1020 also performs memory management functions by allocating and de-allocating shadow ED descriptors, shadow TD descriptors and data buffers associated with TD-related data. When a descriptor is added to a shadow list, transfer manager 1020 retrieves a free descriptor from a pool of free descriptors. When a descriptor is removed from one of the shadow lists, host transfer manager 1020 deposits the removed descriptor back in the pool. In one embodiment, the pool is comprised of a list of free descriptors. Data buffers are managed in a similar way. A free data buffer list contains free data buffers that host transfer manager 1020 allocates and de-allocates as necessary. Note that due to synchronization delays for example as may be caused by network delays, removed descriptors and data butlers may be attached to temporary delay lists before they are put back in the free pools. Transfer manager 1020 also performs other housekeeping tasks to support the bridged connection. These include interrupt processing, frame counter generation and providing an early response mechanism for HCD-initiated commands that require a response earlier than can be delivered by remote peripheral interface controller 510 in FIG. 5. Host USB transfer manager 1020 maintains a copy of the USB port power control registers to enable an early response to requests for port power information.

Host USB transfer manager 1020 also provides methods for resolving potentially conflicting state changes simultaneously initiated by the HCD and remote USB peripheral interface controller 510 in FIG. 5. Transfer manager 1020 receives command update packets sent by client USB transfer manager 530 in FIG. 5, disassembles them into individual commands and executes them. Returned or retired TDs may have associated inbound data which client USB transfer manager 530 in FIG. 5 sends in data update packets. Transfer manager 1020 receives those packets and stores the data in CPU hardware sub-system 1000 in a format compatible with the associated HCD drivers. Periodic updates of the remote OPR are also received and used to update the OPR of USB transfer manager 1020.

TD retirement commands sent by client USB transfer manager 530 in FIG. 5 are processed by retiring the TDs from HCD and shadow TD lists. Given that a descriptor list may be paused or that an ED may be disabled when data is returned from the client transfer manager, transfer manager 1020 temporarily stores the data in data buffers. If the associated end point or descriptor is removed, the associated data buffer is released without saving the data to the HCD domain. TDs for incomplete buffers are marked for delay until data buffers are completed and HCD memory is accessible for update; following which the TDs are retired in strict order.

Client USB transfer manager 530 in FIG. 5 receives update packets and data from host computer system 100. Transfer manager 530 in FIG. 5 applies the changes to corresponding lists stored in local memory. Added TDs may have associated outbound data that host transfer manager 1020 sends in update data packets. Client USB transfer manager 530 in FIG. 5 receives the packets and stores the data in local data buffers. Client USB transfer manager 530 in FIG. 5 monitors modifications to the descriptor lists initiated by peripheral interface controller 510 in FIG. 5, assembles a sequence of update commands and transmits them to the host transfer manager 1020. Typically, peripheral interface controller 510 in FIG. 5 (which performs substantially similar operations to an industry-compatible USB host controller) removes TDs from the head of remote TD lists or makes modifications to certain fields within the associated EDs. When a TD is removed, it is added to the head of a done queue. In an embodiment, client USB transfer manager 530 in FIG. 5 traverses the done queue once each memory cycle and transmits the retired TDs and associated inbound data back to transfer manager 1020 so that the shadow TD lists in the HCD domain can be synchronized with the equivalent remote lists and the TDs retired to the HCD. Client USB transfer manager 530 in FIG. 5 also queues and transmits TD-related data packets, ED modifications, OPR contents to host USB transfer manger 1020. Some descriptor list updates require the list to be in a defined state, for example a descriptor may need to be in a paused state before being updated. These operations may require independent acknowledgment before continuing with other operations to ensure descriptor integrity. Client USB transfer manager 530 in FIG. 5 also receives operational register updates and updates the OPR in USB peripheral interface controller 510 (FIG. 5) as appropriate. In an OHCI embodiment, the present host controller state (Operational, Suspend, Reset or Resume) as defined by the OHCI specification is set via the operational registers. It is the responsibility of the HCD to ensure that the timing requirements for each state are respected. However, because of variable network latency, even though OPR updates are generated at the host with the correct time spacing, they may not arrive at USB peripheral interface controller 510 in FIG. 5 with the same time separation. Therefore the application of the state change may need to be delayed by client USB transfer manager 530 in FIG. 5.

Audio Bridge Description

In an embodiment, host audio transfer manager 1030 connects to system bus 1032 of hardware sub-system 1000. For example, in an embodiment, connection 1032 is a Peripheral Component Interconnect (PCI) bus. Other embodiments such as PCI-Express are also suitable. In an embodiment, transfer manager 1020 connects to network 120 using network interface 1040. In another embodiment, transfer manager 1030 connects to network 120 using a network interface controller associated with sub-system 1000. Host audio transfer manager 1030 operates in conjunction with client audio transfer manager 840 in FIG. 8 to bridge one or more audio connections between host audio drivers and remote audio peripherals such as a microphone or speakers at GUI system 100 in FIG. 1. Transfer manager 1030 presents a set of industry-compatible audio interface functions over bus 1032 to audio drivers such as HD-Audio or AC'97 audio drivers and higher level audio software including device drivers associated with the supported remote audio devices. In an embodiment, an HD- Audio audio interface is presented to audio drivers executed by sub-system 1000. Host audio transfer manager 1030 comprises list processing resources, including DMA resources and memory in addition to an audio controller register set substantially similar to the register set of an industry-compatible audio controller such as an HD Audio controller register set.

Audio Bridge Description—Output Audio Embodiment

In an HD-Audio embodiment, host audio transfer manager 1030 presents one or more audio interface functions to audio drivers associated with CPU hardware sub-system 1000 in order for audio connections to be established with remote HD Audio peripheral device interfaces. In an output audio embodiment such as a bridged connection between host computer system 130 and a remote speaker device, host audio transfer manager 1030 assembles and communicates output audio data streams and HD-Audio audio codec commands to client audio transfer manager 840 in FIG. 8.

Host audio transfer manager 1030 retrieves output audio data in host memory container format from the audio driver domain on bus 1032. Transfer manager 1030 then generates audio packets comprising an integer number of audio frames by converting audio samples into tightly-packed audio frame format for each stream and concatenating frames into packets. As one example, three 20-bit samples may be necessary for a 20.83 microsecond audio frame. These samples are stored in three 32-bit containers and repacked into a 64-bit segment. Transfer manager 1030 initiates a cadence generator for each output audio stream using stream format registers (MULT, CHAN, and BITS) specified in the HD Audio specification to determine the number of host memory container format samples needed per stream packet as well as the stream packet sizes. The number of host memory container samples determines how many host memory containers must be read from bus 1032 and packed into each stream packet. Transfer manager 1030 provides frame timing to flag frame boundaries so that the correct amount of data from each stream required for each frame is captured, where each stream may have a different sample rate. A sub-multiple cadence generator in transfer manager 1030 (using a cadence based upon the DIV parameter of the stream format registers specified in the HD Audio specification) is also initiated for each stream that is a sub-multiple of typical 48 KHz or 44.1 KHz base sample rates.

In an embodiment, transfer manager 1030 does not generate audio packets when placed in reset (i.e. when the HD-Audio-specified CRST# flag is asserted) so all audio data pipelines are halted and flushed. In addition, stream buffers implemented in transfer manager 1030 are disabled allowing the transfer of control information and audio codec commands to be prioritized at low latency. In order to maximize the largest contiguous block of commands and ensure back-to-back command transfer on the data connection without any spurious frame gaps, a now packet is initiated in the case when an audio codec command arrives after a defined number of streams have already been placed in that packet. To ensure timely transfer of audio codec commands in cases where all streams are inactive, a frame including an audio codec command (but without audio stream data) is generated and added to the present packet in any case when a codec command is available. In cases where streams are active, codec commands are multiplexed with audio data in a ratio of one command per frame (when commands are available in the command buffer as found in a standard link frame format).

In an embodiment, transfer manager 1030 does not include streams that have their associated stream synchronization flag (HD-Audio-specified SSYNC) or stream reset flag (HD-Audio-specified SRST) asserted. If the HD-Audio-specified RUN flag for a particular stream is de-asserted, the cadence generator is initialized and restarts when the RUN flag is once again asserted. In addition, if RUN is de-asserted for a particular stream, audio data for that stream is not transmitted once the present frame has been processed. Bridge operational control information destined for client audio transfer manager 840 in FIG. 8 is appended to the packet header. Operational control information includes outbound packet buffer activation/de-activation instructions and active/inactive stream status information. Register information needed by remote transfer manager 840 in FIG. 8 is also communicated.

In an embodiment, transfer manager 1030 monitors changes to register values that trigger frame header updates or other operational changes and updates frame headers or changes operational mode accordingly. For example, audio codec control information such as CRST# and SRST information is embedded in the frame header (as specified in the HD Audio specification). In an embodiment, transfer manager 1030 may also manage data under-run and overflow conditions. In a case where a data under-run on audio bus 804 in FIG. 8 occurs, an empty FIFO interrupt (HD-Audio-specified FIFOE) is triggered and the frame multiplexing continues with no data being inserted for that stream. In one embodiment, mixer 810 in FIG. 8 detects an under-run in the output frame queue and transmits the under-run error status in a packet via client transfer manager 840 in FIG. 8 to transfer manager 1030 which in turn triggers a FIFOE error to the host audio drivers.

Transfer manager 1030 forwards fully constructed outbound packets to network interface 1040. In one embodiment, network interface 1040 marks audio packets for priority transfer using Quality of Service (QoS) characterization, for example using the TOS field in the MAC header that enables prioritization of the audio packet through switches across the network.

Audio Bridge Description—Input Audio Embodiment

In an embodiment where input audio streams are communicated from one or more input audio peripherals such as a microphone at GUI system 100 in FIG. 1, transfer manager 1030 manages packet buffers for input audio streams. Transfer manager 1030 also processes inbound packets and frames at a rate defined by an inbound frame timing signal. Inbound packet processing functions include processing embedded operational control information and audio frames present in the packet payload. Timing parameters, control information and audio codec responses are extracted from the packets. If an audio frame is not available due to the packet buffer being empty while it is enabled, frame de-multiplexing waits for the next available frame. Once a frame is available, it is broken into its constituent pieces and the samples converted to host memory container format as defined by audio controller register values stored locally. The separated input audio streams are then forwarded to stream buffers from which they are transferred to CPU hardware sub-system 1000 under DMA control.

Transfer manager 1030 evaluates the status of the HD-Audio specified SSYNC signal for each stream. If SSYNC is negated, the stream data is converted to host memory container format and transferred to CPU sub-system memory. In an embodiment, all incoming data for a stream is dropped if SSYNC is asserted. The update of registers such as CRST# and SRST results in control information being inserted in the headers of outgoing frames for communication to client audio transfer manager 840 in FIG. 8. In an embodiment, all stream data is dropped until the stream reset signal has been looped back from client audio transfer manager 840 in FIG. 8 in the case of the assertion of a stream reset bit (SRST) for an input audio stream. If transfer manager 1030 detects the negation of the HD-Audio specified RUN flag for a stream, all incoming data for the stream is dropped after transfer manager 1030 has processed the present frame. In an embodiment, transfer manager 1030 performs state changes only after the present frame has been processed.

Transfer manager 1030 may also manage packet buffers associated with input audio streams. In an embodiment, packet buffers are disabled and inbound packets are immediately processed upon startup. This allows initial communication comprising register updates and audio codec responses to be processed rapidly. Once a stream is activated (via codec commands), input audio stream data from the remote audio codec starts flowing and a packet buffer for the stream is initialized under control of operational control information in the inbound packet header communicated from the client transfer manager. Once a buffer threshold is reached, packet de-multiplexing commences and continues until an appropriate number of input audio packets have been buffered. The optimum buffer depth is based on network latency and may be a fixed or a programmable value. Once a sufficient number of packets are buffered, processing of packets continues. When the associated remote bridging module detects that an audio codec is no longer generating input data, the corresponding inbound packet buffer is de-asserted via operational control information in the packet header. If a packet buffer becomes empty (implying packet loss or a network latency condition that exceeds the buffer tolerance) the packet buffer refills before packet processing commences. In one embodiment, transfer manager 1030 is notified of a CORB memory error to signal that audio samples may be shifted in time and the packet buffer may not be optimized for the present network latency. If reset is asserted (CRST#), packet de-multiplexing continues but de-multiplexing of inbound frames and extraction of audio codec responses is halted. Packets currently in the packet buffer are de-multiplexed into frames so that frame header information can be recovered. Audio data associated with packets is flushed and stream pipelines are re-initialized.

In an HD-audio embodiment, transfer manager 1030 uses a reference clock to provide reference timing for cadence generators and other frame timing logic. Separate frame timing circuits are used for outbound and inbound frames using outbound and inbound reference counters. Timing for the reference counters is adjustable using speedup and slowdown timing control parameters. In the case of outbound audio packets, speedup and slowdown timing control requests are issued by client transfer manager 840 (ref FIG. 8) based on an output packet buffer fill level. In the case of inbound packets, speedup and slowdown timing control requests are issued locally based on the current fill level of the input packet buffer. On request, the nominal time required to generate frame synchronization signals is then adjusted accordingly. Transfer manager 1030 also provides DMA timing signals for local DMA controllers. By associating the DMA timing with the frame timing, responses from client audio codecs may be returned to CPU sub-system memory at a rate expected by the audio drivers. In one embodiment, transfer manager 1030 also supports an HD Audio-compatible immediate command interface capable of receiving commands directly from an audio driver associated with the audio driver domain rather than via a CORB command buffer. Transfer manger 1030 accesses the commands for insertion in an outbound frame. In an inbound direction, transfer manger 1030 receives inbound responses from the remote system and presents them to the audio drivers using an HD Audio compatible response interface.

The several embodiments described herein are solely for the purpose of illustration. Persons skilled in the art will recognize from this description other embodiments may be practiced with modifications and alterations limited only by the claims.

What is claimed is:

1. A method of managing a Graphical User Interface (GUI) comprising a communicatively coupled set, the communicatively coupled set comprising a GUI module, a display and an at least one user input device, the at least one user input device enabled to generate Human Interface Device (HID) events, the method comprising:

establishing, by the GUI module, a remote desktop session between the GUI and a computer over an Internet Protocol (IP) network, the remote desktop session comprising a remote desktop image rendered and encoded by the computer;

selecting, by the GUI, User Interface (UI) settings responsive to a first event, the first event received from one of the at least one user input device, the computer or a computing appliance, the computing appliance in communicative coupling with the GUI via a GUI session, the computing appliance agnostic to the remote desktop session, the UI settings determining a distribution of the HID events between the remote desktop session and the GUI session;

and displaying, on the display, via the GUI session, an appliance image from the computing appliance, the appliance image combined with the remote desktop image based on the UI settings, wherein displaying the appliance image comprises selectively overlaying the remote desktop image with the appliance image by adjusting an overlaying parameter according to a priority, the priority determined from at least one of the first event, a user input event or the GUI session.

2. The method of claim 1 wherein the first event is received via the IP network.

3. The method of claim 1 wherein the first event initiates a display focus change between the computer and the computing appliance.

4. The method of claim 1 wherein the first event is a pointer device update.

5. The method of claim 1 wherein the overlaying parameter comprises a level of alpha blending for the appliance image with the remote desktop image.

6. The method of claim 5 wherein overlaying the remote desktop image comprises utilizing a display controller to blend the remote desktop image with the appliance image during display refresh.

7. The method of claim 1 wherein establishing the remote desktop session comprises reserving a display area for an overlay associated with the computing appliance.

8. The method of claim 7 wherein reserving the display area comprises reserving a sidebar function.

9. The method of claim 8 wherein the sidebar function is one of an operating system gadget or an application widget.

10. The method of claim 1 further comprising responding to the first event by at least one of updating a sprite of the GUI or changing an audio volume of the GUI.

11. The method of claim 1 wherein the selecting the UI settings comprises directing audio information between the computer and the computing appliance.

12. The method of claim 1 wherein the selecting the UI settings comprises communicating data between the computing appliance and equipment connected to the IP network, the equipment independent of the computer, the computing appliance separated from the IP network by the GUI.

13. The method of claim 1 wherein the selecting the UI settings comprises communicating data between the computing appliance and an Input/Output (I/O) device of the GUI, the I/O device comprising an audio output device.

14. The method of claim 1 wherein the establishing the remote desktop session comprises communicating at least one peripheral bus data structure between the GUI module and the computer, the at least one peripheral bus data structure related to a peripheral bus interconnect between the GUI module and the at least one user input device.

15. The method of claim 14 wherein the at least one peripheral bus data structure is a Universal Serial Bus (USB) descriptor data structure.

16. The method of claim 14 wherein the at least one peripheral bus data structure is an encoded High Definition Audio (HD Audio) data structure.

17. The method of claim 1 wherein the GUI session is established after the remote desktop session terminates.

18. The method of claim 1 wherein the GUI session is sustained when the remote desktop session terminates.

* * * * *